(12) United States Patent
Ku et al.

(10) Patent No.: US 9,984,171 B2
(45) Date of Patent: May 29, 2018

(54) SYSTEMS AND METHODS FOR DETECTING FALSE CODE

(75) Inventors: Young Bae Ku, Seoul (KR); Eui Won Park, Bucheon-si (KR); Chang Sup Ko, Seongnam-si (KR); Seung Wan Lee, Seoul (KR); Dong Hyun Kim, Seoul (KR); Ho Jin Jung, Seoul (KR); Sung Hoon Jin, Seoul (KR)

(73) Assignee: eBay Korea Co. Ltd., Seoul (KR)

( * ) Notice: Subject to any disclaimer, the term of this patent is extended or adjusted under 35 U.S.C. 154(b) by 855 days.

(21) Appl. No.: 12/470,975

(22) Filed: May 22, 2009

(65) Prior Publication Data

US 2010/0235910 A1    Sep. 16, 2010

(30) Foreign Application Priority Data

May 22, 2008   (KR) .................. 10-2008-0047551

(51) Int. Cl.
*G06F 21/55*   (2013.01)
*G06F 17/30*   (2006.01)

(52) U.S. Cl.
CPC .......... *G06F 17/3089* (2013.01); *G06F 21/55* (2013.01); *G06F 2221/2119* (2013.01)

(58) Field of Classification Search
CPC ... H04L 63/145; H04L 63/1441; H04L 63/14; H04L 63/1425; H04L 29/06551;
(Continued)

(56) References Cited

U.S. PATENT DOCUMENTS 8,225,405 B1 *   7/2012   Peterson et al. ................ 726/24
8,448,241 B1 *   5/2013   Kadakia .............. G06F 11/3688
                                            726/22

(Continued)

FOREIGN PATENT DOCUMENTS

CN           1969524 A      5/2007

OTHER PUBLICATIONS

"Chinese Application Serial No. 200910203212.9, Office Action dated Apr. 19, 2013", with English translation of claims, 19 pgs.
(Continued)

*Primary Examiner* — Michael R Vaughan
(74) *Attorney, Agent, or Firm* — Schwegman Lundberg & Woessner, P.A.

(57) ABSTRACT

Systems and methods for detecting false code in web pages linked to a web site are provided. One system includes a web server for administering the web site and a surveillance server for collecting generated or updated web pages from among the web pages linked to the web site, selecting tags of a given tag type included in the collected web pages, determining whether the selected tags comprise false code, and providing the determination result to an administrator terminal such that an administrator can check the determination result. One method includes collecting web pages that were generated or updated within a set time period from among the web pages linked to the web site, determining whether tags included in the collected web pages comprise false code, and providing the determination result to an administrator terminal such that an administrator can check the determination result.

25 Claims, 6 Drawing Sheets

(58) Field of Classification Search
CPC ............... H04L 29/06877; H04L 9/002; H04L 63/1408; H04L 43/00; H04L 63/1416; H04L 63/1433; G06F 21/56; G06F 21/00; G06F 21/50; G06F 21/563; G06F 21/566; G06F 21/564; G06F 21/567; G06F 21/51; G06F 21/552; G06F 21/554; G06F 2221/2119; G06F 17/3089
USPC .............................. 726/22; 715/234; 707/802
See application file for complete search history.

(56) References Cited

U.S. PATENT DOCUMENTS

| | | | |
|---|---|---|---|
| 8,578,166 B2* | 11/2013 | De Monseignat et al. ... | 713/175 |
| 8,584,233 B1* | 11/2013 | Yang ...................... | G06F 21/51 709/229 |
| 8,819,823 B1* | 8/2014 | Banerjee ........................ | 726/23 |
| 2004/0187023 A1* | 9/2004 | Alagna et al. ................ | 713/200 |
| 2006/0161986 A1* | 7/2006 | Singh et al. ..................... | 726/24 |
| 2007/0124582 A1* | 5/2007 | Shannon ................. | H04L 51/12 713/164 |
| 2007/0174915 A1* | 7/2007 | Gribble ................... | G06F 21/53 726/24 |
| 2008/0060071 A1* | 3/2008 | Hennan ............... | H04L 63/1416 726/22 |
| 2008/0082662 A1* | 4/2008 | Dandliker et al. ............ | 709/225 |
| 2008/0127306 A1* | 5/2008 | Blumfield ........... | H04L 63/1441 726/3 |
| 2008/0127338 A1* | 5/2008 | Cho et al. ........................ | 726/22 |
| 2008/0141342 A1* | 6/2008 | Curnyn ............... | H04L 63/0227 726/3 |
| 2008/0168558 A1* | 7/2008 | Kratzer ................... | G06F 21/55 726/23 |
| 2008/0222736 A1* | 9/2008 | Boodaei et al. ................ | 726/27 |
| 2008/0235103 A1* | 9/2008 | Baccas et al. .................. | 705/26 |
| 2009/0064337 A1* | 3/2009 | Chien ................... | G06F 21/564 726/25 |
| 2009/0126026 A1* | 5/2009 | Kim et al. ....................... | 726/27 |
| 2009/0165132 A1* | 6/2009 | Jain ......................... | G06F 21/51 726/22 |
| 2009/0282477 A1* | 11/2009 | Chen et al. ...................... | 726/22 |
| 2010/0005531 A1* | 1/2010 | Largman et al. ................ | 726/24 |
| 2010/0205215 A1* | 8/2010 | Cook et al. .................... | 707/781 |
| 2011/0030060 A1* | 2/2011 | Kejriwal ......................... | 726/25 |
| 2011/0219449 A1* | 9/2011 | St. Neitzel et al. ............ | 726/23 |
| 2011/0296526 A1* | 12/2011 | Kim et al. ....................... | 726/24 |
| 2014/0250532 A1* | 9/2014 | Lalonde ................ | G06F 21/566 726/24 |

OTHER PUBLICATIONS

"Chinese Application Serial No. 200910203212.9, Office Action dated May 19, 2014", with English translation of claims, 9 pgs.

"Chinese Application Serial No. 200910203212.9, Office Action dated Jul. 3, 2012", with English machine translation, 27 pgs.

"Chinese Application Serial No. 200910203212.9, Office Action dated Oct. 25, 2013", with English translation of claims, 17 pgs.

"Chinese Application Serial No. 200910203212.9, Office Action dated Dec. 8, 2014", with English translation of claims, 20 pgs.

"Chinese Application Serial No. 200910203212.9, Request for Re-examination filed Mar. 23, 2015", with English translation of claims, 23 pgs.

"Chinese Application Serial No. 200910203212.9, Response filed Jan. 9, 2014 to Office Action dated Oct. 25, 2013", with English translation of claims, 13 pgs.

"Chinese Application Serial No. 200910203212.9, Response filed Aug. 4, 2014", with English translation of claims, 15 pgs.

"Chinese Application Serial No. 200910203212.9, Response filed Sep. 2, 2013", with English translation of claims, 12 pgs.

"Chinese Application Serial No. 200910203212.9, Response filed Nov. 19, 2012", with English machine translation, 18 pgs.

"Chinese Application Serial No. 200910203212.9, Voluntary Amendment filed Feb. 26, 2013", with English machine translation, 14 pgs.

Wei, Jianping, et al., "Design of web page virus defense system", Application Research of Computers, 8, (Aug. 2006), 120-122, 132.

"Chinese Application Serial No. 200910203212.9, Notice of Reexamination dated Jul. 7, 2016", 29 pgs.

"Chinese Application Serial No. 200910203212.9, Response filed Aug. 22, 2016 to Notice of Reexamination dated Jul. 7, 2016", 13 pgs.

* cited by examiner

SYSTEMS AND METHODS FOR DETECTING FALSE CODE

CROSS-REFERENCE TO RELATED APPLICATION

This application claims the benefit under 35 U.S.C. § 119 of Korean Patent Application No. 10-2008-0047551, filed May 22, 2008 which is hereby incorporated by reference in its entirety.

BACKGROUND

1. Field

The present invention relates to a system and method for detecting false code, and more particularly, to a system and method for detecting false code in a web site linked to one or more web pages.

2. Description of the Related Art

With development of the Internet, the number of web sites is sharply increasing. In such a web site environment, contents provided by Web 2.0 and user created content (UCC) service users are also increasing. Since a general user can organize contents of web sites, actions for malicious purposes against the management policies of web sites are also continuously increasing.

For example, methods of embedding malicious code in vulnerable web sites and spreading the malicious code to a large number of general users visiting the web sites are becoming widespread. In particular, attacks on national public institutions are rapidly increasing and causing serious problems. As used in this application, "malicious code" refers to a program developed to disturb a user in smooth operation of a computer, including but not limited to computer viruses, computer worms (self-replicable malicious code), Trojan horses (malicious code not infecting other targets but causing a system to malfunction), and so on.

The administrator of a web site may allow use of hypertext markup language (HTML) tags, such as IFRAME and SCRIPT tags, in order to incorporate content provided by users, but malicious code may be inserted into such HTML tags. The problem is manifest because the administrator of a web site desires to allow use of these HTML tags to incorporate desired functionality.

A normal HTML tag and malicious HTML tag have basically the same format, and thus it is difficult to distinguish them from each other. Also, tags having different purposes are input according to non-formal characteristics of a web site, for example, portals, moving pictures, price comparisons, and shopping sites, and thus it is impossible to limit a user input to a predetermined pattern. As such, currently an administrator must examine all tags in all linked web pages to determine whether or not there is a problem. However, in a huge web site in which tens of thousands of postings are registered, it is substantially impossible to monitor all the web pages.

Consequently, a system that can rapidly check an entire web site in a short time period is needed.

BRIEF SUMMARY

One aspect of an embodiment of the present invention is directed to a system and method for detecting false code in a web site, involving collecting a part or whole of web pages linked from a web site, determining whether tags included in the collected web pages comprise false code or normal code, and providing the determination result to an administrator terminal, thereby enabling an administrator to efficiently detect false code.

The present invention is also directed to a system and method for detecting false code in a web site, involving collecting a generated or updated web page among web pages linked from a web site, determining whether tags included in the collected web pages comprise a false code or normal code, and thereby reducing check time.

Another aspect of an embodiment of the present invention is directed to a system and method for detecting false code in a web site, involving collecting a part or whole of web pages linked from a web site, and informing an administrator terminal of false code or normal code included in the collected web pages to enable rapid countermeasure against false code, thus allowing a system to be stably managed.

Yet another aspect of an embodiment of the present invention is directed to another system and method for detecting false code in a web site, involving rapidly detecting and coping with a false code included in a part or whole of web pages linked from a web site, thus enabling a user to safely use the web site.

According to an aspect of the present invention, there is provided a system for detecting false code, including: a web server for administering a web site linked to one or more web pages; and a surveillance server for collecting a generated or updated web page among the linked web pages, determining whether tags included in the generated or updated web page comprise false code or normal code, and providing the determination result to an administrator terminal such that an administrator can check the determination result.

The surveillance server may collect address information of a web page generated or updated within a set time period among the web pages linked from the web site administered by the web server, and may determine whether a previously set tag among the tags included in the generated or updated web page comprises false code or normal code.

The tag may be a hypertext markup language (HTML) tag for inserting information into the web page. In a particular embodiment, the tag is an IFRAME, SCRIPT, OBJECT, EMBED, DIV, or SPAN tag. The false code may violate a policy of the web site and/or may affect an administrator or user of the web site.

The system for detecting false code may further include a database for separately storing false code and normal code patterns according to the determination result.

According to another aspect of the present invention, there is provided a system for detecting false code, including: a collector for collecting address information of generated or updated web pages among web pages linked from a web site administered by a web server; a loader for loading the web pages according to the collected address information; and a determiner for determining whether tags included in the loaded web pages comprise false code or normal code.

The collector may collect address information of a web page generated or updated within a predetermined time period among the web pages linked from the web site administered by the web server, and the loader may load content of a previously set tag included in the web pages or a web page including the previously set tag among the web pages according to the collected address information of the web pages.

Here, the tag may be an HTML tag for inserting information into the web pages. In a further embodiment the tag is an IFRAME, SCRIPT, OBJECT, EMBED, DIV, or SPAN tag. The false code may violate a policy of the web site and/or may affect an administrator or user of the web site.

According to still another aspect of the present invention, there is provided a method of detecting false code, including: administering, at a web server, a web site linked to one or more web pages; and collecting, at a surveillance server, a generated or updated web page among the linked web pages, determining whether tags included in the generated or updated web page comprise false code or normal code, and providing the determination result to an administrator terminal such that an administrator can check the determination result.

In a further embodiment of the invention, the providing of the determination result to an administrator terminal may include: collecting a web page generated or updated within a previously set time period among the linked web pages; searching tags included in the collected web page for a tag type previously set to be checked; determining whether the tags included in the web page comprise false code or normal code; and providing the determination result to the administrator terminal such that the administrator administering the web server can check the determination result.

The tag may be an HTML tag for inserting information into the web page. In a further embodiment, the tag is an IFRAME, SCRIPT, OBJECT, EMBED, DIV, or SPAN tag. The false code may violate a policy of the web site and/or may affect the administrator or user of the web site.

The method may further include separately storing the false code and the normal code according to the determination result.

According to yet another aspect of the present invention, there is provided a method of detecting false code, including: collecting, at a surveillance server, address information of generated or updated web pages among web pages linked from a web site administered by a web server; loading, at the surveillance server, the web pages according to the collected address information of the web pages; and determining, at the surveillance server, whether tags included in the loaded web pages comprise false code or normal code.

The collecting of the address information of generated or updated web pages may include collecting address information of a web page generated or updated within a set time period among the web pages linked from the web site administered by the web server. The loading of the web pages may include loading content of a previously set tag type included in the web pages or loading a web page including the previously set tag among the web pages according to the collected address information of the web pages.

The tag may be an HTML tag for inserting information into the web pages. In a further embodiment the tag is an IFRAME, SCRIPT, OBJECT, EMBED, DIV, or SPAN tag. The false code may violate a policy of the web site and/or may affect the administrator or user of the web site.

BRIEF DESCRIPTION OF THE DRAWINGS

The above and other features and advantages of the present invention will become more apparent to those of ordinary skill in the art by describing in detail preferred exemplary embodiments thereof with reference to the attached drawings in which.

DETAILED DESCRIPTION

Figure 1:
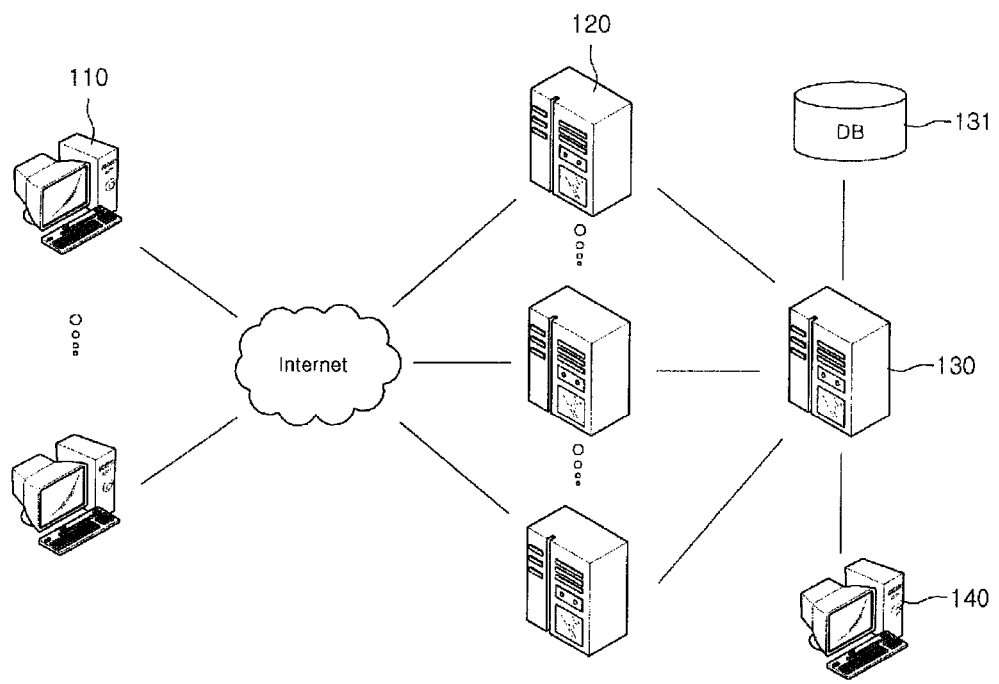
FIG. 1 schematically illustrates a system according to an exemplary embodiment of the present invention.

The present invention relates to a system and method for detecting false code, and more particularly, to a system and method for detecting false code in a web site linked to one or more web pages.

The subject matter of the present invention is described with specificity to meet statutory requirements. But this description is not intended to limit the scope of this patent. Rather, the inventors have contemplated that the claimed subject matter might also be embodied in other ways, to include different steps or combinations of steps similar to those described in this document, in conjunction with other present or future technologies.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, formats, and numerous other details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

The invention is described more fully hereinafter with reference to the accompanying drawings, in which embodiments of the invention are shown. These drawings are hereby incorporated in their entirety. This invention may, however, be embodied in many different forms and should not be construed as limited to the embodiments set forth herein. Rather, these embodiments are provided to fully enable those of ordinary skill in the art to embody and practice the invention.

The present invention provides a technique for efficiently detecting false code in a web site. More specifically, the exemplary embodiments of the present invention involve collecting a part or whole of web pages, for example, generated or updated web pages linked from a web site, determining whether code or tags included in the web pages comprise false code or false tags, and providing the determination result to an administrator terminal such that an administrator can efficiently detect the false code.

FIG. 1 schematically illustrates a system according to an exemplary embodiment of the present invention.

As illustrated in FIG. 1, the system for detecting false code in a web site according to an exemplary embodiment of the present invention may include a user terminal 110, a web server 120, a surveillance server 130, a database (DB) 131, and an administrator terminal 140.

The web server 120 may administer a web site linked to one or more web pages and provide a variety of information. For example, in one embodiment the web pages administered by vendors are linked to a web site corresponding to an online open market, and the vendors can upload information relating to products onto the web pages. In a further embodiment, a user can access a web page in the web site using a user terminal, check the information relating to a desired product, and purchase the product.

The vendors may use hypertext markup language (HTML) tags, such as IFRAME and SCRIPT tags, in order to display information relating to products, and false code or a false tag may be inserted into these HTML tags. There are various types of false code including 1) a type that hacks a personal computer (PC) by inserting malicious code distributing a computer virus, or uses a PC as an agent for a distribute denial of service (DDoS) attack, 2) another type that inserts code installing an anti-virus vaccine and tricks a user into scanning for viruses using false diagnosis information, and 3) still another type that unfairly manipulates the benefit of accumulating a part of a settlement fund, that is, a reward process in a shopping mall, or leads to price comparison or direct transaction.

Thus, the surveillance server 130 may check HTML tags at a predetermined interval. More specifically, it is possible to determine whether HTML tags included in a web page in which information relating to a product is uploaded comprise false code or normal code. Then, the surveillance server 130 may provide the determination result to the administrator terminal 140.

Also, the surveillance server 130 may inform the administrator that false code is detected using an alarm, message, and so on.

Here, an HTML tag is used to insert information into the web page. The tag may be an IFRAME, SCRIPT, OBJECT, EMBED, DIV, or SPAN tag.

The surveillance server 130 may store address information of web pages including detected false code, that is, a false code list, in the DB 131 and manage it. Also, the surveillance server 130 may store an exception list including reliable web sites, e.g., Gmarket, Samsung Electronics, and Microsoft, not to be searched for false code in the DB 131 and manage it. In other words, the DB 131 may be classified into a first DB storing a false code list and a second DB storing a normal code list or an exception list.

In addition, an HTML tag to be checked may be set by the administrator in the DB 131.

In this way, an exemplary embodiment of the present invention determines whether or not false code exists only in generated or updated web pages among web pages linked from a web site, and provides the determination result to an administrator terminal, thereby narrowing a detection range. Consequently, the time taken to detect false code in a web site can be reduced.

Figure 2:
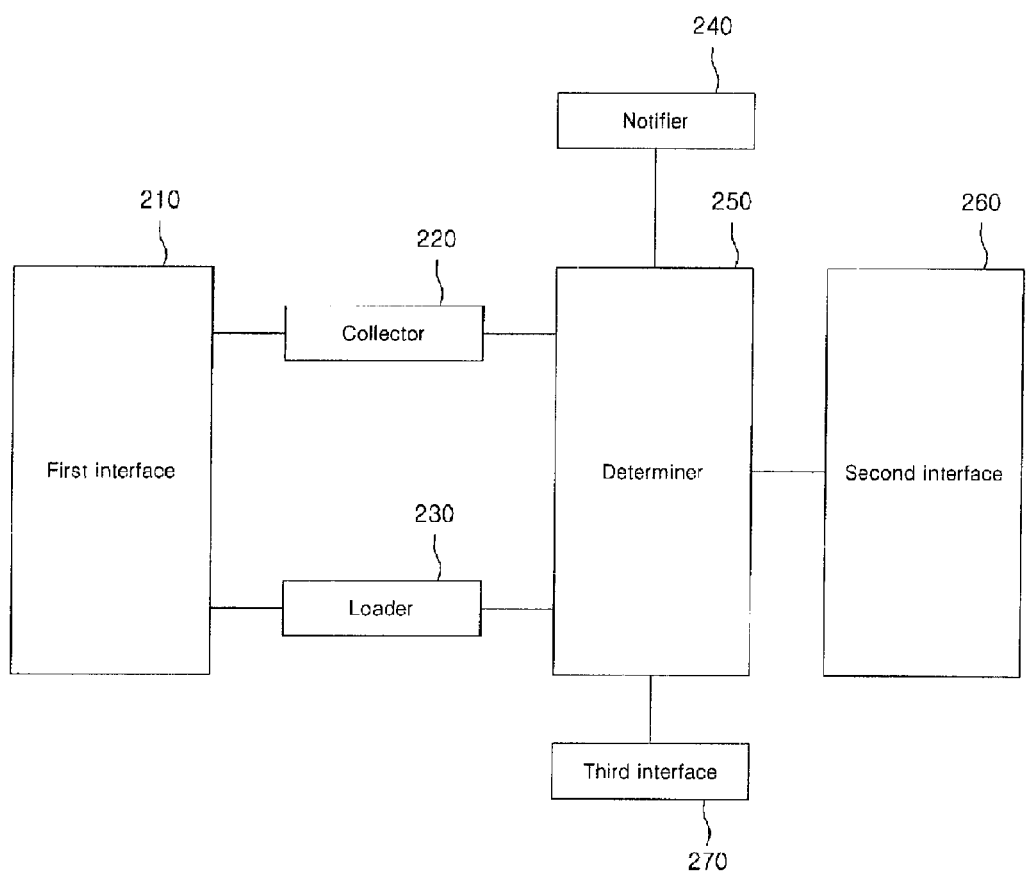
FIG. 2 is a block diagram of a surveillance server such as the surveillance server shown in FIG. 1.

FIG. 2 is a block diagram of a surveillance server such as the surveillance server 130 shown in FIG. 1.

As illustrated in FIG. 2, the surveillance server may include a first interface 210, a collector 220, a loader 230, a notifier 240, a determiner 250, a second interface 260, and a third interface 270.

The surveillance server may interoperate with the web server through the first interface 210, with the DB through the second interface 260, and with the administrator terminal through the third interface 270.

Through the first interface 210, the collector 220 may collect address information, e.g., uniform resource locators (URLs), of generated or updated web pages, i.e., web pages to be collected, among one or more web pages linked from a web site administered by the web server.

The loader 230 may be provided with the collected address information of the web pages, load the web pages based on the address information, and provide the loaded web pages to the determiner 250. Upon receipt of the loaded web pages, the determiner 250 may check HTML tags set to be checked, e.g., some or all of the tag types IFRAME, SCRIPT, OBJECT, EMBED, DIV, and SPAN, among all the HTML tags in the web pages from the DB through the second interface 260.

The determiner 250 may determine whether HTML tags in the loaded web pages comprise false code or normal code based on the HTML tags to be checked, and provide the determination result to the administrator terminal through the third interface 270.

According to the determination result, the notifier 240 may output an alarm to inform an administrator that there is a web page including false code, and also generate and send a message, e.g., a short message service (SMS) message, a long message service (LMS) message, a multimedia message service (MMS) message, e-mail, or a voice message, including text or voice, e.g., "One hundred instances of false code have been detected," input in advance to the administrator.

When no false code is detected, needless to say, it is unnecessary to send a message.

In this way, an exemplary embodiment of the present invention enables a part or whole of a web page linked from a web site to be collected and an administrator terminal to be informed of false code or normal code included in the web page. Thus, an administrator administering/managing the web site can rapidly cope with a false code, for example, treat or block the corresponding web page.

Figure 3:
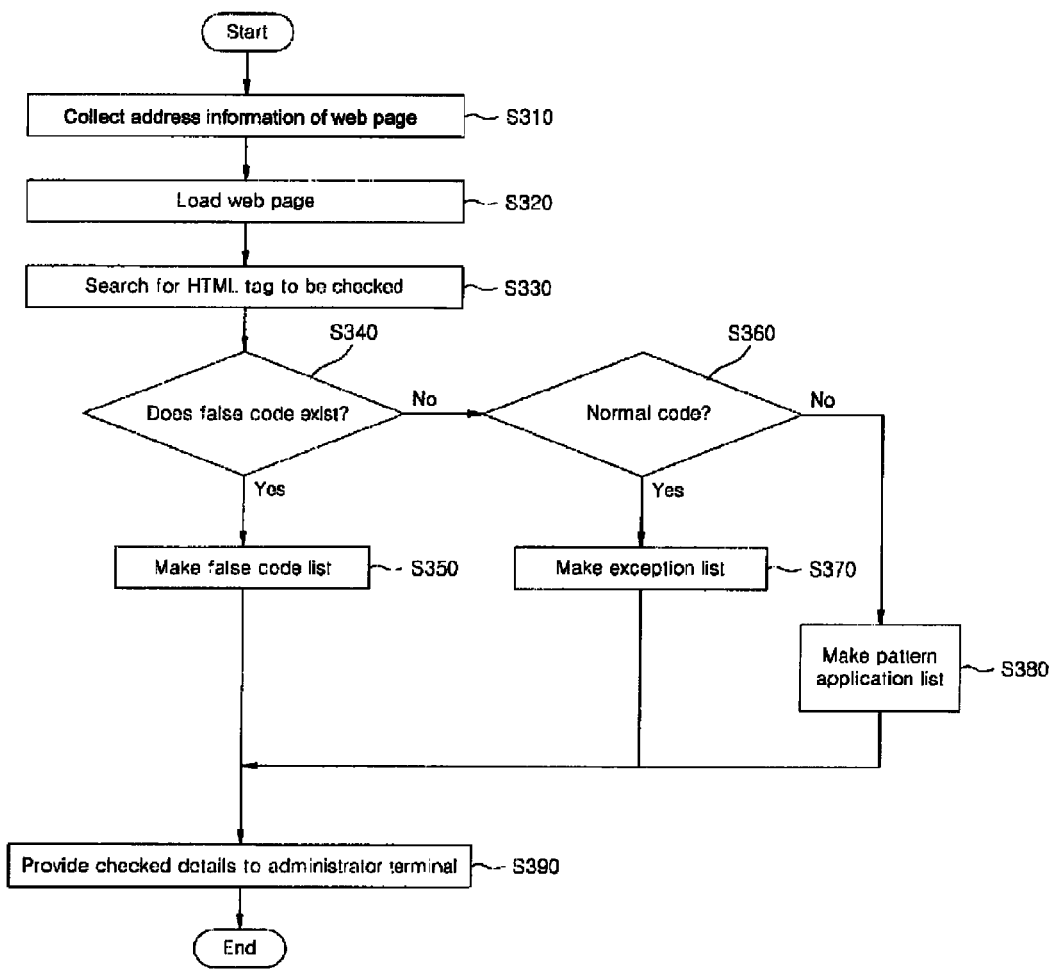
FIG. 3 is a flowchart illustrating a method of detecting false code according to an exemplary embodiment of the present invention.

FIG. 3 is a flowchart illustrating a method of detecting false code according to an exemplary embodiment of the present invention.

As illustrated in FIG. 3, a surveillance server may periodically monitor whether or not all web pages linked from a specific web site are updated or generated, and when there are newly generated or updated web pages, may collect address information of the generated, modified or updated web pages, that is, the web pages to be collected (S310).

This is because a huge web site, such as a portal site or a shopping mall site, is linked to tens of thousands or hundreds of thousands of web pages and it is substantially impossible to check all the web pages. Thus, the surveillance server may pick only web pages generated or updated by users within a set time period and collect address information of the web pages.

The surveillance server may load the web pages according to the collected address information of web pages (S320). When the surveillance server loads the web pages, it may search for HTML tags set to be checked and check HTML tags in the web pages (S330).

The surveillance server may load the entire contents of the web pages or may load contents of a specific HTML tag in the web pages or a web page including the specific HTML tag. This is because not all HTML tags, but only some of them are typically used to introduce malicious code into a web page.

The surveillance server may determine whether the HTML tags to be checked comprise false code or not (S340). When false code exists in the web pages, the surveillance server may make false code list including address information of the corresponding web page or the corresponding HTML tag (S350).

When no false code exists in the web page, the surveillance server may determine whether the HTML tags to be checked comprise normal code or not (S360). When the HTML tags to be checked comprise normal code, the surveillance server may make an exception list to store address information of the corresponding web page or the corresponding HTML tag (S370). On the other hand, when the HTML tags to be checked do not comprise normal code, the surveillance server may make a pattern application list including the HTML tags (S380). This is because the HTML tags included in the web pages are not included in either a false code list or normal (exception) code list, and thus an administrator may later determine whether the HTML tags are to be stored in the false code list or the normal (exception) code list.

At that time, address information of HTML tags included in the pattern application list may be newly applied to the false code list or normal code (exception) list according to the administrator's determination. Then, when the same pattern is later detected, on a further iteration of the method, the pattern can be automatically processed as false code or normal code without the administrator's intervention.

When the surveillance server finishes checking HTML tags of all the generated or updated web pages, it may provide the checked details to an administrator terminal such that the administrator can check the checked details (S390). In one embodiment, the checked details are displayed on the administrator terminal as described below with reference to FIG. 4.

Figure 4:
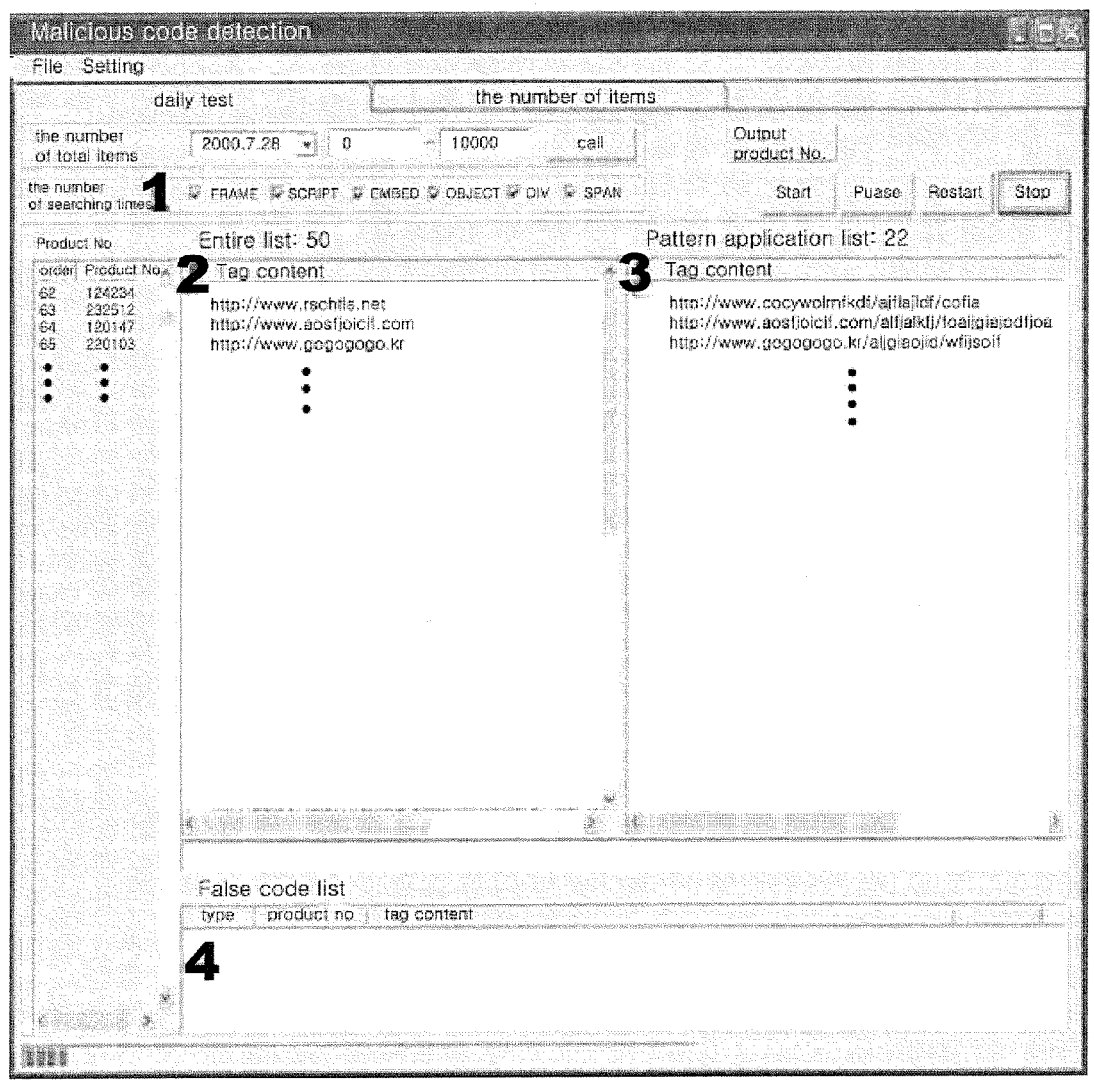
FIG. 4 illustrates an example of details for detecting false code according to an exemplary embodiment of the present invention.

FIG. 4 illustrates an example of details for detecting a false code according to an exemplary embodiment of the present invention.

As illustrated in FIG. 4, a false code detection window according to an exemplary embodiment of the present invention may display HTML tag types set to be checked 1, a list of web pages or HTML tags set to be collected 2, a pattern application list 3, a false code list 4, and so on.

These will be described in detail now. First. HTML tag types to be checked 1, for example, IFRAME, SCRIPT, OBJECT, EMBED, DIV, and SPAN may be set by an administrator.

A part or whole of web pages set to be collected 2, that is, web pages generated or updated within a predetermined time period, may be displayed using, for example, types of HTML tags and content of the HTML tags.

It is determined whether the set HTML tag types 1 among HTML tags in the collected web pages comprise false code or normal code, and a pattern application list 3 may be displayed using, for example, types of HTML tags and contents of the HTML tags. This is because false code may have a uniform pattern that can be detected. Here, the pattern application list 3 includes HTML tags that cannot be automatically determined as false code or normal code and are determined by an administrator later, and patterns of the HTML tags can then be applied to a false code list or normal code list.

According to the determination result, a false code list 4 may be displayed using, for example, types of HTML tags, URLs of web pages including the HTML tags, and content of the HTML tags.

In this way, an exemplary embodiment of the present invention collects only generated or updated web pages among web pages linked from a web site, and informs an administrator terminal of a false code or a false tag included in the web pages. Thus, it is possible to rapidly cope with the false code or false tag, and a system can be stably managed.

Figure 5:
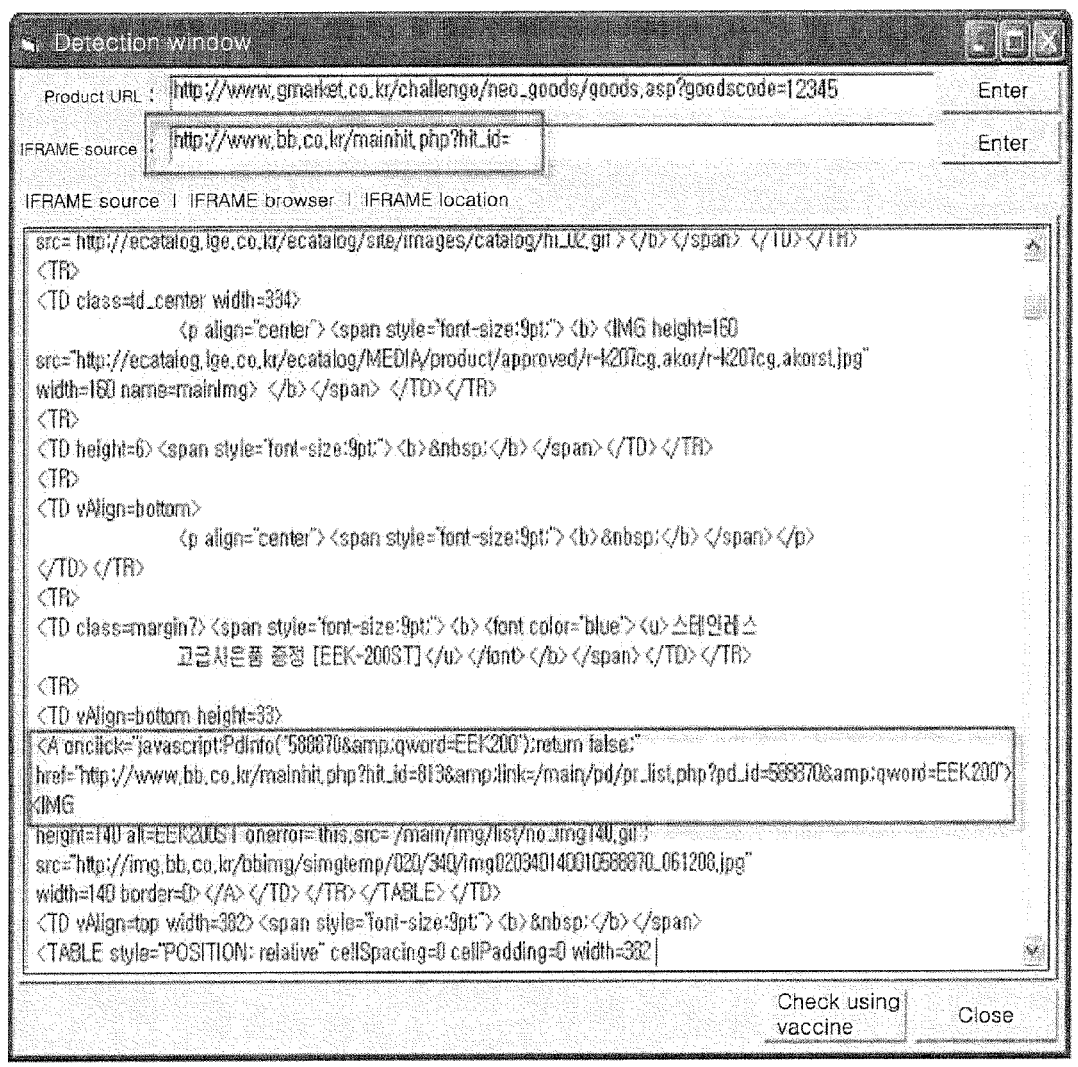
FIG. 5 illustrates an example of a screen in which false code is detected according to an exemplary embodiment of the present invention.

FIG. 5 illustrates an example of a screen in which false code is detected according to an exemplary embodiment of the present invention.

As illustrated in FIG. 5, content of a web page including false code (a rectangular section) is shown. Content of a particular instance of false code may be examined by clicking any one of the instances of false code displayed in the false code list 4 displayed in the detection window of FIG. 4.

Figure 6:
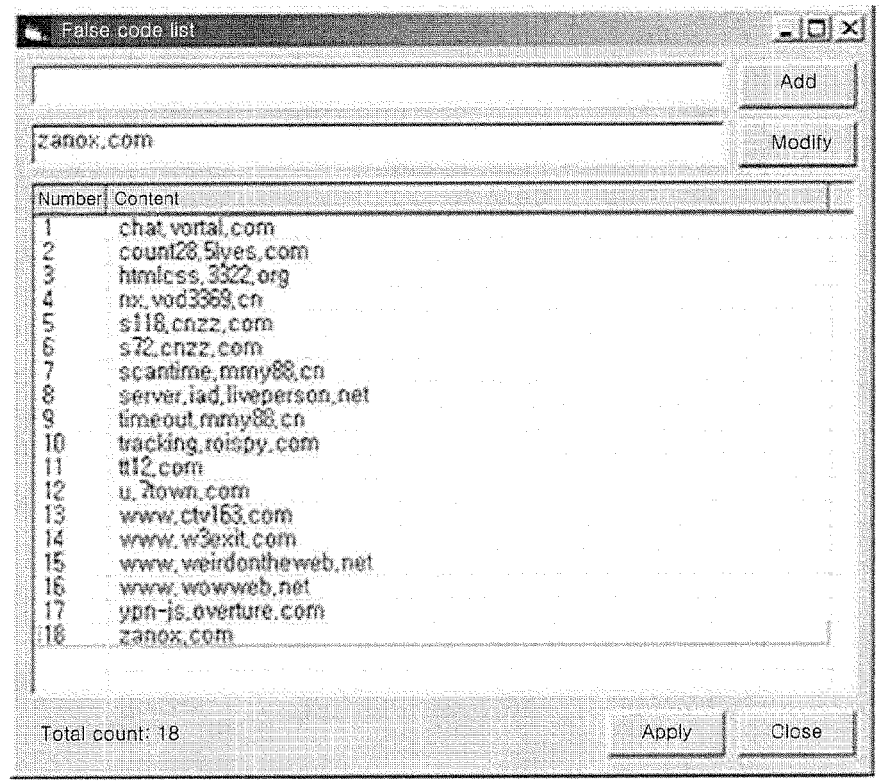
FIG. 6 illustrates examples of a screen for managing false code and normal code patterns according to an exemplary embodiment of the present invention.
Figure 6:
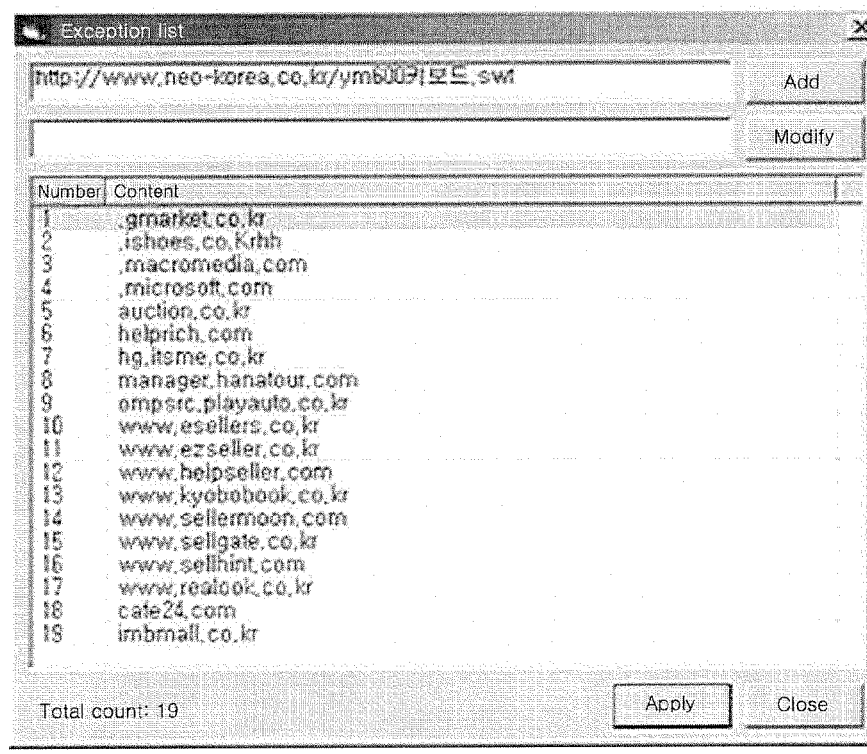

FIG. 6 illustrates examples of a screen for managing false code according to an exemplary embodiment of the present invention.

As illustrated in FIG. 6, a surveillance server according to an exemplary embodiment of the present invention can separately store and manage an upper false code list and a lower normal code (exception) list. Based on such lists, it is possible to determine whether a collected web page includes false code or not. Items in the pattern application list 3 of FIG. 4 may be sorted by an administrator as false code or normal code, and the pattern may then be applied to the false code or normal code (exception) lists presented here.

The above-described method can be implemented as computer-readable code in a computer-readable recording medium. The computer-readable recording medium is any recording medium for storing data that can be read by a computer system. Examples of the computer-readable recording medium include a read-only memory (ROM), a random access memory (RAM), a compact disk-read only memory (CD-ROM), a magnetic tape, a floppy disk, and optical data storage. Alternatively, the medium may be implemented in the form of carrier waves (e.g., Internet transmission).

Computer-readable media include both volatile and non-volatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the invention are not limited to the configurations and methods of the exemplary embodiments described above, and all or some of the exemplary embodiments may be selectively combined to yield variants. Many different arrangements of the various components depicted, as well as components not shown, are possible without departing from the spirit and scope of the present invention. Embodiments of the present invention have been described with the intent to be illustrative rather than restrictive. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method comprising:
   requesting, by a surveillance server, from a web server having a plurality of pages accessible to user terminals over a network, a list of addresses of pages from the plurality of pages that have been generated or updated within a pre-specified period of time;
   receiving, by the surveillance server, from the web server, the list of addresses of pages that have been generated or updated within the pre-specified period of time;
   loading, by the surveillance server, from the web server, at least some of the pages having an address in the list of addresses, each of the loaded pages having, in a body area, a part of a page including a network address that is different than that loaded page's address from the list of addresses;
   determining, by the surveillance server, whether network addresses included in the loaded pages are malicious based on the network addresses matching malicious network addresses in a false code list; and
   determining, by the surveillance server, whether network addresses included in the loaded pages are normal based on the network addresses matching network addresses in a normal code list; and
   blocking network access of the user terminals to the part of the page comprising the network address based on the network address appearing in the false code list.

2. The method of claim 1, wherein the body area of each loaded page comprises a plurality of different markup language tags, the part of the page that includes the network address being a pre-selected markup language tag from the plurality of different markup language tags; and wherein the method further comprises:
   searching within the pre-selected markup language tag of the loaded pages for network addressees.

3. The method of claim 2, wherein the plurality of markup language tags are Hypertext Markup Language (HTML) tags.

4. The method of claim 2, wherein the plurality of markup language tags include one or more of: an iframe tag, a script tag, an object tag, an embed tag, a div tag, or a span tag.

5. The method of claim 2, wherein the each of the plurality of markup language tags include at least two different classes of tag types, each of the tag types selectable through a user interface element.

6. The method of claim 1, wherein the addresses in the list of addresses and the network addresses are Uniform Resource Locators (URLs).

7. The method of claim 1, further comprising:
   determining whether network addresses included in the loaded pages are normal based on the network addresses matching normal network addresses in a normal code list.

8. The method of claim 7, further comprising:
   storing separately, in a data store, a first set of network addresses determined to be normal based on appearing in the normal code list and a second set of network addresses determined to be malicious based on appearing in the false code list.

9. The method of claim 1, further comprising:
   in response to determining that some of the network addresses in the loaded pages are malicious, generating a notification indicating a quantity of the network addresses that have been determined to be malicious.

10. The method of claim 1, wherein addresses of pages that have not been generated or updated not within the pre-specified period of time are not included in the list of addresses.

11. The method of claim 1, wherein pages that have not been generated or updated not within the pre-specified period of time are not loaded.

12. The method of claim 1, further comprising:
   determining that one or more network addresses found in the loaded pages are not in the false code list nor in a normal code list, the normal code list comprising a list of addresses designated as being normal; and
   responsive to determining that the one or more network addresses are not in the false code list nor the normal code list, storing the one or more network addresses in a database for later manual inspection.

13. A system comprising:
   one or more processors of a machine;

a memory comprising instructions that when executed by the one or more processors perform operations comprising:

request, by a surveillance server, from a web server having a plurality of pages accessible to user terminals over a network, a list of addresses of pages from the plurality of pages that have been generated or updated within a pre-specified period of time;

receive, from the plurality of pages, from the web server, the list of addresses of pages that have been generated or updated within the pre-specified period of time;

load, by the surveillance server, from the web server, at least some of the pages having an address in the list of addresses, each of the loaded pages having, in a body area, a part of a page including a network address that is different than that loaded page's address from the list of addresses;

determine, by the surveillance server, whether network addresses included in the loaded pages are malicious based on the network addresses matching malicious network addresses in a false code list; and determine, by the surveillance server, whether network addresses included in the loaded pages are normal based on the network addresses matching network addresses in a normal code list; and block network access of the user terminals to the part of the page comprising the network address based on the network address appearing in the false code list.

14. The system of claim 13, wherein the body area of each loaded page comprises a plurality of different markup language tags, the part of the page that includes the network address being a pre-selected markup language tag from the plurality of different markup language tags; and wherein the operations further comprise:

search within the pre-selected markup language tag of the loaded pages for network addressees.

15. The system of claim 14, wherein the plurality of markup language tags are Hypertext Markup Language (HTML) tags.

16. The system of claim 14, wherein the plurality of markup language tags include one or more of: an iframe tag, a script tag, an object tag, an embed tag, a div tag, or a span tag.

17. The system of claim 13, wherein the addresses in the list of addresses and the network addresses are Uniform Resource Locators (URLs).

18. The system of claim 13, the operations further comprising:

determining whether network addresses included in the loaded pages are normal based on the network addresses matching normal network addresses in a normal code list.

19. The system of claim 18, the operations further comprising:

storing separately, in a data store, a first set of network addresses determined to be normal based on appearing in the normal code list and a second set of network addresses determined to be malicious based on appearing in the false code list.

20. The system of claim 13, the operations further comprising:

in response to determining that some of the network addresses in the loaded pages are malicious, generate a notification indicating a quantity of the network addresses that have been determined to be malicious.

21. A machine-readable storage device having instruction data to cause a machine to perform operations comprising:

request, by a surveillance server, from a web server having a plurality of pages accessible to user terminals over a network, a list of addresses of pages from the plurality of pages that have been generated or updated within a pre-specified period of time;

receive, by the surveillance server, from the web server, the list of addresses of pages that have been generated or updated within the pre-specified period of time;

load, by the surveillance server, from the web server, at least some of the pages having an address in the list of addresses, each of the loaded pages having, in a body area, a part of a page including a network address that is different than that loaded page's address from the list of addresses;

determine, by the surveillance server, whether network addresses included in the loaded pages are malicious based on the network addresses matching malicious network addresses in a false code list; and determine, by the surveillance server, whether network addresses included in the loaded pages are normal based on the network addresses matching network addresses in a normal code list; and block network access of the user terminals to the part of the page comprising the network address based on the network address appearing in the false code list.

22. The machine-readable storage device of claim 21, wherein the body area of each loaded page comprises a plurality of different markup language tags, the part of the page that includes the network address being a pre-selected markup language tag from the plurality of different markup language tags; and wherein the operations further comprise:

search within a pre-selected markup language tag of the loaded pages for network addressees.

23. The machine-readable storage device of claim 21, wherein the addresses in the list of addresses and the network addresses are Uniform Resource Locators (URLs).

24. The machine-readable storage device of claim 21, wherein the plurality of markup language tags include one or more of: an iframe tag, a script tag, an object tag, an embed tag, a div tag, or a span tag.

25. The machine-readable storage device of claim 21, the operations further comprising:

in response to determining that some of the network addresses in the loaded pages are malicious, generate a notification indicating a quantity of the network addresses that have been determined to be malicious.

* * * * *